United States Patent [19]
Yokogawa

[11] Patent Number: 5,583,846
[45] Date of Patent: Dec. 10, 1996

[54] OPTICAL DISC AND SYSTEM FOR GENERATING A TRACKING ERROR SIGNAL FOR THE OPTICAL DISC

[75] Inventor: Fumihiko Yokogawa, Saitama-ken, Japan

[73] Assignee: Pioneer Electronic Corporation, Tokyo, Japan

[21] Appl. No.: 512,345

[22] Filed: Aug. 8, 1995

Related U.S. Application Data

[63] Continuation of Ser. No. 144,252, Nov. 1, 1993, abandoned.

[30] Foreign Application Priority Data

Nov. 5, 1992 [JP] Japan ..................... 4-295669

[51] Int. Cl.$^6$ .................................................. G11B 7/00
[52] U.S. Cl. ..................... 369/275.3; 369/44.13; 369/44.26
[58] Field of Search .................... 369/32, 44.32, 369/44.26, 44.28, 44.13, 54, 48, 275.3, 275.4

[56] References Cited

U.S. PATENT DOCUMENTS

| | | | |
|---|---|---|---|
| 5,099,467 | 3/1992 | Sumihiro et al. | 369/44.26 |
| 5,117,412 | 5/1992 | Ito et al. | 369/32 |
| 5,214,629 | 5/1993 | Watanabe et al. | 369/44.26 |
| 5,270,991 | 12/1993 | Verboom | 369/44.26 |
| 5,272,686 | 12/1993 | Shigemori | 369/44.26 |
| 5,278,814 | 1/1994 | Deguchi et al. | 369/44.26 |
| 5,321,675 | 6/1994 | Ito et al. | 369/44.26 |
| 5,404,345 | 4/1995 | Taki | 369/275.3 |
| 5,488,595 | 1/1996 | Takeuchi et al. | 369/275.3 |

*Primary Examiner*—Nabil Hindi
*Attorney, Agent, or Firm*—Nikaido, Marmelstein, Murray & Oram LLP

[57] ABSTRACT

A first tracking pit is disposed on one of sides of a track of an optical disc at a position corresponding to a first timing, and a second tracking pit is disposed on the other side of the track at a position corresponding to a second timing. The first tracking pits and the second tracking pits of adjacent two tracks are deflected in a time axis direction.

6 Claims, 13 Drawing Sheets

FIG.4 a
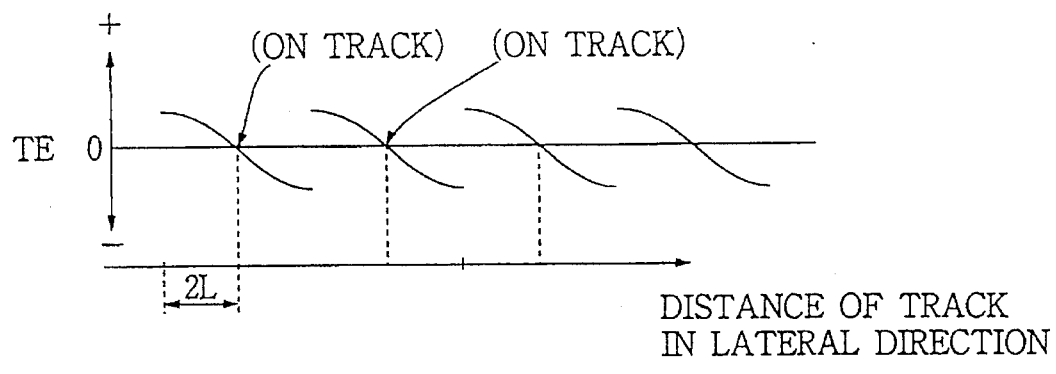
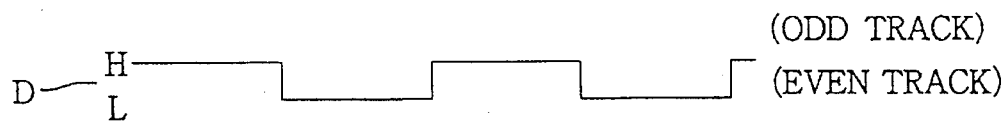
FIG.4 b
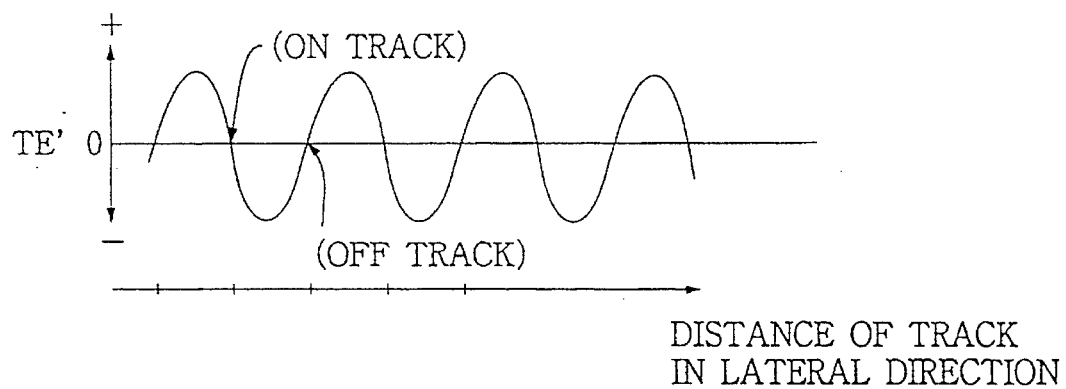

FIG.7
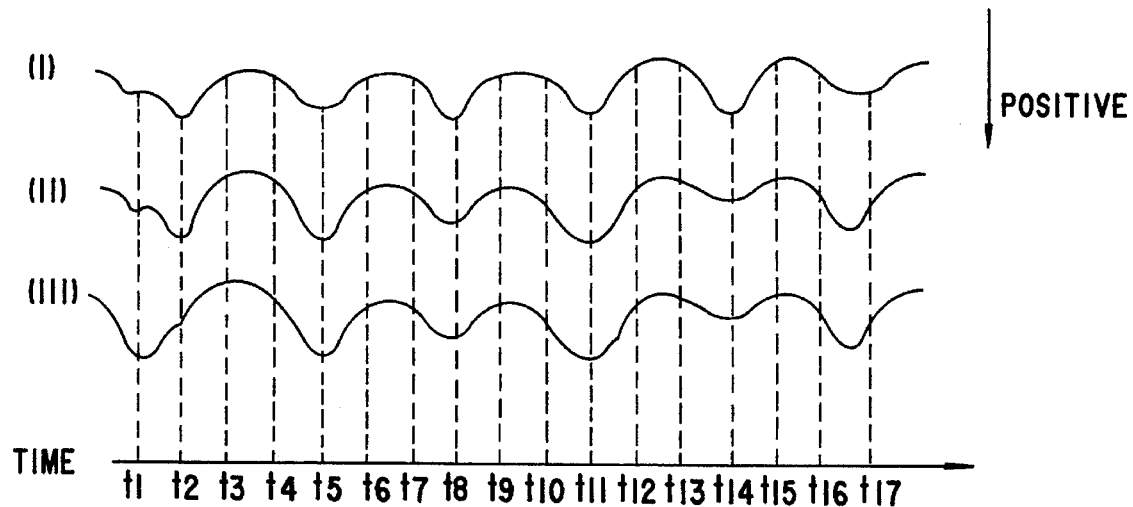
FIG.8
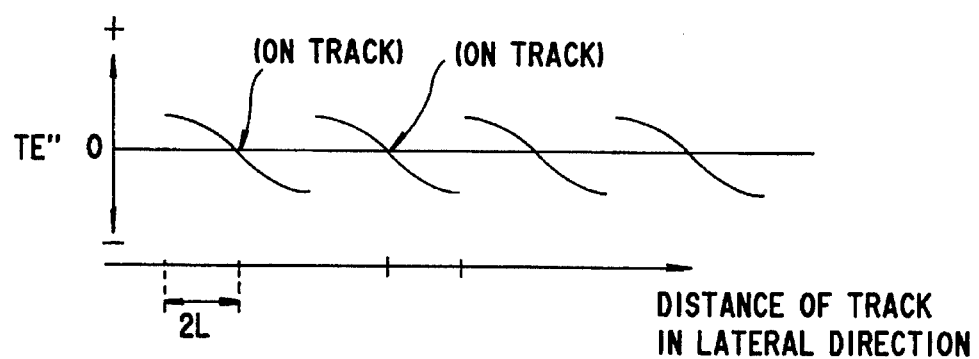
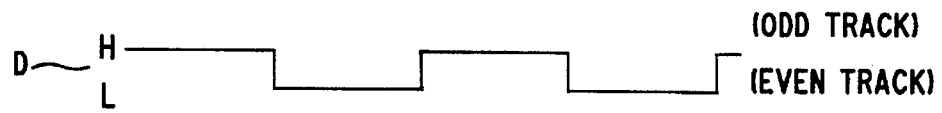

OPTICAL DISC AND SYSTEM FOR GENERATING A TRACKING ERROR SIGNAL FOR THE OPTICAL DISC

This application is a continuation division of application Ser. No. 08/144,252 Filed Nov. 1, 1993 now abandoned.

BACKGROUND OF THE INVENTION

The present invention relates to an optical disc and a system for generating a tracking error signal for the optical disc having a high recording density by using a sampled servo tracking method.

As a recording format for the optical disc, a sampled servo tracking method is known. The optical disc using the sampled servo tracking method is provided with a preformat on a recording film comprising servo areas (fields) at 1376 points on a track. By sampling the servo area, tracking error and clock for recording and reproducing are generated.

FIG. 9 shows a conventional optical disc DK dependent on a recording format of the sampled servo tracking method. The optical disc DK has a program area PA in which a spiral track is formed from the inner potion to the outer periphery of the disc to provide a plurality of tracks arranged in the radial direction of the disc. One track is divided into 32 sectors. Each sector has 43 segments. A first segment #0 of the 43 segments has a preformat comprising a synchronizing signal Ssync of 1 byte for synchronizing at each sector unit and an address $S_{ADR}$ of 1 byte for addressing the sector unit. Each of the other segment #1 to #42 has 18 bytes comprising a servo area Fs of 2 bytes and a data area FD of 16 bytes.

FIG. 10 shows the servo area Fs of 2 bytes comprising a first servo byte #1 and a second servo byte #2. The first servo byte #1 has a preformat comprising a first wobbled tracking pit Pw1 formed at a third bit and a second wobbled tracking pit Pw2 formed at an eighth bit in a first 16-track (A). The first tracking pit Pw1 is inwardly deflected from a track center Tc in the radial direction by ¼ track pitch and the second tracking pit Pw2 is outwardly deflected from the track center Tc by ¼ track pitch. A tracking error is detected by the difference between the reflected lights at first and second tracking pits Pw1 and Pw2.

The second servo byte #2 has a clock pit CP for synchronization, Which is preformatted at a twelfth bit. Between the second tracking pit Pw2 and the clock pit CP, a mirror surface having a distance of 19-channel clock length is provided. The 19-channel clock is counted for synchronizing each segment. Furthermore, a focus error is detected in the synchronization detecting period.

At a next 16-track (B), a first tracking pit Pw1 is provided at a fourth bit. Since the position of the first tracking pit Pw1 is changed between the 3 bit and 4 bit at every 16-track, the number of tracks during search is detected with accuracy.

When the servo area Fs is irradiated with a laser beam, a detected signal including a tracking signal ST1 (ST1A and ST1B) and a synchronizing signal Ssync is generated as shown in FIG. 10.

The operation for detecting the tracking error will be described with reference to FIG. 11.

When first and second tracking pits Pw1 and Pw2 are irradiated with a laser beam A which passes the track center Tc, an RF (Radio Frequency) signal is generated shown by a waveform SA. The intensity of the reflected light is low at the position near the pit because of the diffraction of light. When the beam A passes the clock pit CP, the intensity of the reflected light is the lowest. When the pits are irradiated with a laser beam B which passes inwardly at the track center, the RF signal is generated as a waveform SB. Since the laser beam B passes the first tracking pit Pw1, the intensity of the reflected light on the first tracking pit is lower than the second tracking pit. A laser beam C passes outwardly at the track center and the second tracking pit Pw2. In the case, the RF signal is generated as a waveform SC which is in reverse of the waveform SB.

The signal is sampled to obtain an output SAMPLE(T1) at the first tracking pit Pw1 and an output SAMPLE(T2) at the second tracking pit Pw2. The difference between the SAMPLE(T1) and the SAMPLE(T2) by the laser beam A is zero. The difference by the beam B is a negative and a positive by the beam C. The difference is used for detecting a tracking error signal TE by the calculation of SAMPLE(T1)−SAMPLE(T2)=TE.

FIG. 12a shows signal pits PT in section formed on the disc DK. When information recorded on the disc is read, the pits are irradiated with the laser beam. The intensity of the reflected light is low at the pit PT. On the disc, a mirror surface is formed between the pits, so that the laser beam is entirely reflected at the mirror surface. Thus, the intensity of the light becomes high.

Consequently, it is necessary to correctly read pits in order to read servo information with accurately. Conventionally, a track pitch Tp is determined larger than a diameter d of a beam spot of the laser beam (about 1.6 μm).

As shown in FIG. 12a, the width of the land is L, the width of the pit is 3L, the diameter d of the beam spot is 3L, and the track pitch Tp=4L.

In order to increase the recording density of the disc, it is considered to reduce the track pitch Tp to the half, about 0.8 μm as shown in FIGS. 12b and 12c. In FIG. 12c, the axis of the laser beam is on the track center, it is called an on-track state. In FIG. 12b, the axis of the laser beam is deflected from the track center, it is called an off-track state. In those states, the difference between the intensity of the reflected light in the on-track state and the intensity of the reflected light in the off-track state is small so that the tracking servo is not accurately operated. Therefore it is difficult to reduce the track pitch.

In order to solve the problem, the applicant of the present invention proposed a tracking pit recording method for a CAV optical disc disclosed in Japanese Patent Application No. 3-64978. FIG. 13 shows a recording format of the CAV optical disc. The disc has tracks 2k, 2k+1, 2k+2, 2k+3 and 2k+4. On the track 2k, tracking pits Pw(2k−1) and Pw(2k) are provided opposite to each other with respect to a track center thereof by a pitch L. A synchronizing pit $P_{SYNC}$ and a discriminating pit $P_{DET}$ are formed on the track center. The tracking pit Pw(2k−1) corresponds to the first tracking pit Pw1 and the tracking pit Pw(2k) corresponds to the second tracking pit Pw2.

On the track 2k+1, a tracking pit Pw(2k+1) is provided opposite to the tracking pit Pw(2k) of the track 2k about a track center of the track 2k+1. Only the synchronizing pit $P_{SYNC}$ is formed on the track center. The tracking pit Pw(2k+1) corresponds to the first tracking pit Pw1 and the tracking pit Pw(2k) corresponds to the second tracking pit Pw2.

It is noted that the tracking pit Pw(2k) is commonly used in the tracks 2k and 2k+1. Namely, the first and second tracks are formed in one track pitch Tp. Thus, the track pitch Tp is reduced to the half, 2L, and the number of tracks is increased twice to increase the recording density twice.

However, in such a method, at the preformat of the tracking pits, if rotating jitter of a recording device occurs, the first tracking pit Pw(2k+1) on the track 2k+1 may deflect from the line of the first tracking pit Pw(2k−1) of the track 2k in the tangential direction by a difference Δx as shown in FIG. 14. At sampling, such deflection causes a deviation of the sampling timing. Hence, a correct tracking error signal can not be obtained.

SUMMARY OF THE INVENTION

An object of the present invention is to provide an optical disc and a tracking error signal generating system for an optical disc where the number of tracks of the disc is increased to increase a recording density while the influence of a rotating jitter is reduced, and hence a stable tracking error signal is generated.

According to the present invention, there is provided an optical disc having a plurality of tracks arranged in a radial direction of the disc, each of the tracks having a plurality of servo areas.

A first tracking pit is disposed on one of the sides of the track in the servo area at a position corresponding to a first timing, and a second tracking pit is disposed on the other side of the track in the servo area at a position corresponding to a second timing.

The first tracking pits and the second tracking pits of adjacent two tracks are deflected in a time axis direction.

The first tracking pits and the second tracking pits of the adjacent two tracks are disposed on different sides with respect to the track. Each of the tracking pits is disposed on a center line between the adjacent tracks.

The other objects and features of this invention will become understood from the following description with reference to the accompanying drawings.

BRIEF DESCRIPTION OF DRAWINGS

FIGS. 4a and 4b are diagrams showing tracking error signals of the present invention and a conventional method;

FIG. 7 shows waveforms of detected signal of the second embodiment;

FIG. 8 is a diagram showing tracking error signals of the second embodiment;

DETAILED DESCRIPTION OF THE PREFERRED EMBODIMENTS

Figure 1:
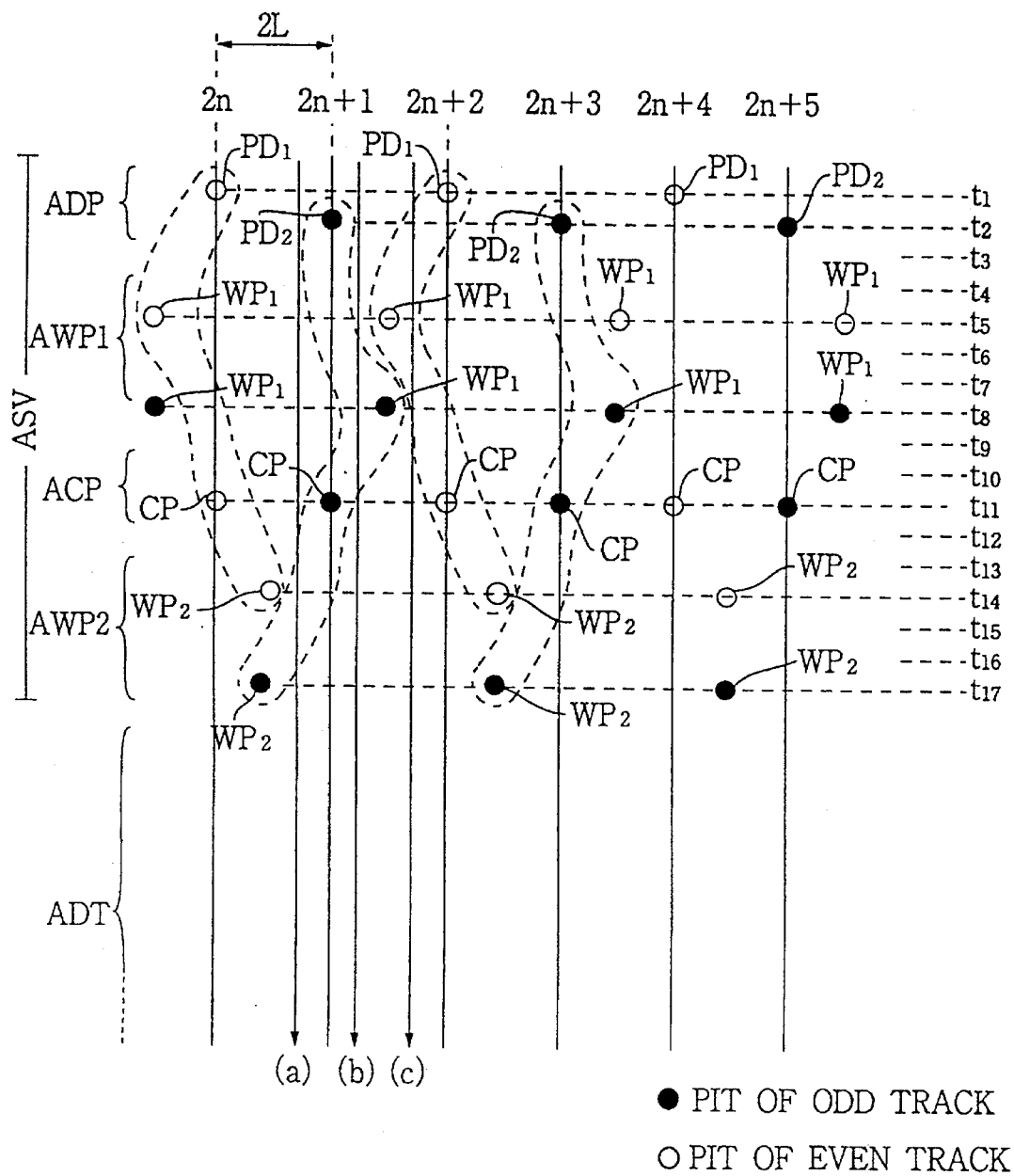
FIG. 1 is a schematic diagram showing a recording format for an optical disc according to the present invention.

Referring to FIG. 1 showing a recording format for an optical disc according to the present invention, a plurality of recording tracks having track numbers 2n to 2n+5 (n is natural number) are disposed on the disc in the radial direction. Each recording track has a plurality of segments. In the embodiment, one of the segment is illustrated. Each segment is provided corresponding to a group of data. The group of data includes a discriminating pit area ADP, a first tracking pit area AWP1, a clock pit area ACP, a second tracking pit area AWP2, and a data area ADT for recording data. Areas ADP, AWP1, ACP, and AWP2 composes a servo area ASV.

In the discriminating pit area ADP, discriminating pits $P_D$ are disposed on the track center, for discriminating the position of the track in the radial direction of the disc. In the segment of the even numbers of tracks 2n, 2n+2, 2n+4, the discriminating pits $P_D$ are provided at positions corresponding to a sampling timing t1. In the segment of the odd numbers of tracks 2n+1, 2n+3, 2n+5, the pits $P_D$ are provided at a sampling timing t2.

In the first tracking pit area AWP1, the first tracking pit WP1 of each of the even tracks 2n, 2n+2, 2n+4 is disposed on the left side of a track center at positions corresponding to a sampling timing t5. In the segment of odd tracks 2n+1, 2n+3, 2n+5, first tracking pits WP1 are provided on the right side of a track center of the odd track at positions corresponding to a sampling timing t8.

In the clock pit area ACP, clock pits CP are provided in a line in the radial direction of the disc on the track centers of even and odd tracks corresponding to a sampling timing t11 indicating a clock generating timing.

In the second tracking pit area AWP2, second tracking pits WP2 are provided on the right side of the track center in the segment of the even tracks 2n, 2n+2, 2n+4 corresponding to a sampling timing t14. In the segment of odd tracks 2n+1, 2n+3, 2n+5, second tracking pits WP2 are provided on the left side of the track center of the odd track corresponding to a sampling timing t17.

It will be seen that a pair of tracking pits are provided for each track, and staggered in the time axis direction. Each tracking pit is disposed on the center line between the adjacent tracks. As a result, the distance between the tracking pits of each recording track is equal to the track pitch 2L.

Figure 2:
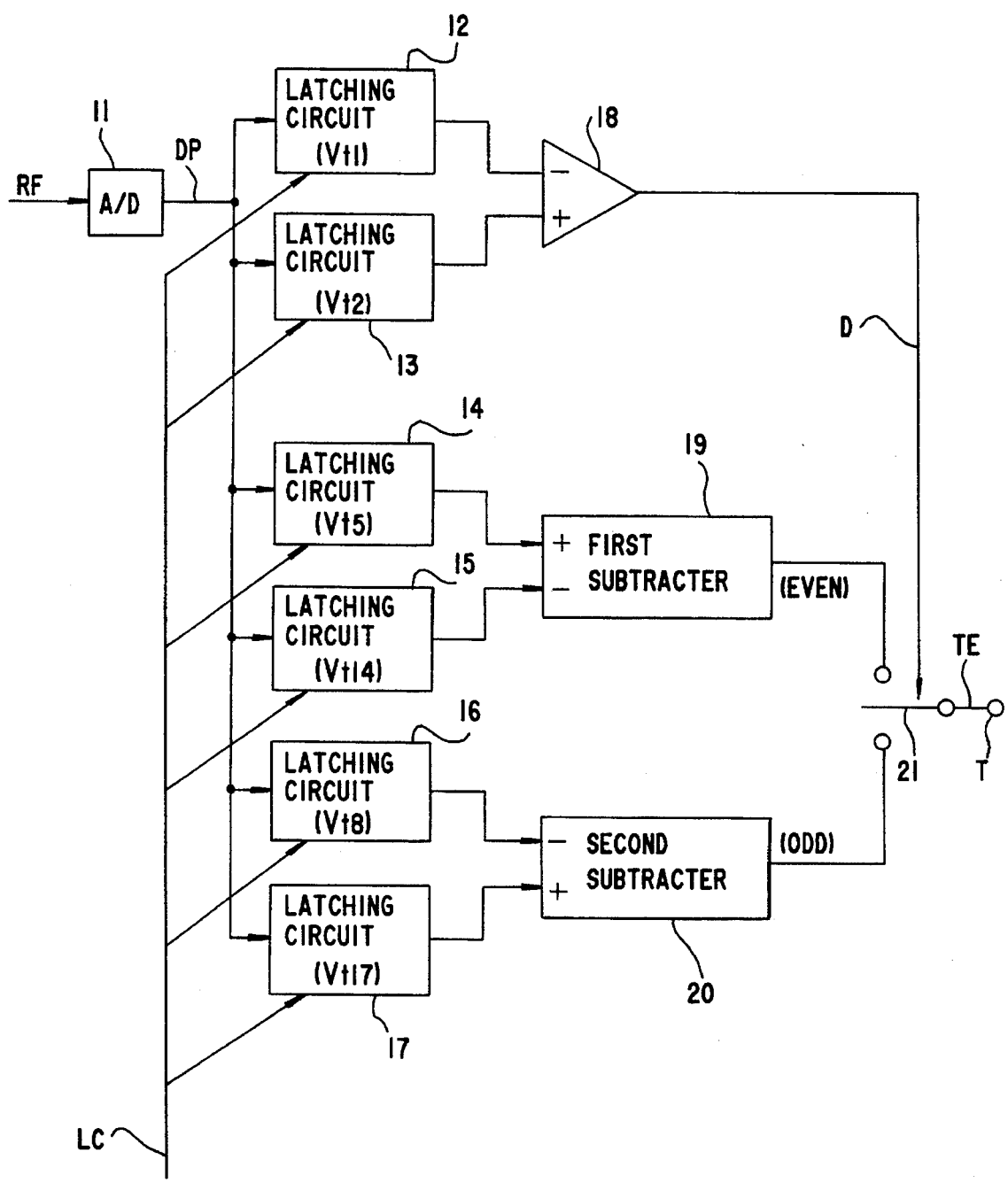
FIG. 2 is a block diagram showing a tracking error signal generating system of the present invention.

Referring to FIG. 2, a tracking error generating system is provided for generating a tracking error signal by using the optical disc shown in FIG. 1. The tracking error is reproduced with a laser beam LB (not shown).

An RF (Radio Frequency) signal from a photodetector (not shown) is applied to an A/D converter 11 where an analog input signal is converted into a digital signal to produce a reproduced data DP. The reproduced data DP is applied to latching circuits 12 to 17 provided corresponding to the sampling timings of the discriminating pits $P_D$ and first and second tracking pits WP1 and WP2 formed on the respective even and odd tracks.

The first latching circuit 12 and the second latching circuit 13 are provided for operating at sampling timings t1 and t2 of the discriminating pits $P_{D1}$ and $P_{D2}$. The third latching circuit 14 and the fourth latching circuit 15 are provided for operating at sampling at sampling timings t5 and t14 of the first tracking pits WP1 and the second tracking pits WP2 formed on the even tracks. The fifth latching circuit 16 and the sixth latching circuit 17 are provided for operating at sampling timings t8 and t17 of the first tracking pits WP1 and the second tracking pits WP2 formed on the odd tracks. Each of the latching circuits is applied with a latch control timing signal LC and the reproduced data DP of the A/D converter 11 is latched at the corresponding sampling timing based on the latch control timing signal LC.

Outputs Vt1 and Vt2 of the first and second latching circuit 12 and 13 are applied to a comparator 18 for comparing the outputs. The comparator 18 discriminates whether the odd or even number of the recording track is reproduced, and produces a discriminating signal D.

Outputs Vt5 and Vt14 of the third and fourth latching circuits 14 and 15 are applied to a first subtracter 19 where the output Vt14 of the fourth circuit 15 is subtracted from the output Vt5 of the third circuit 14 to produce a tracking error signal TE at reproducing of the even track.

Outputs Vt8 and Vt17 of the fifth and sixth latching circuits 16 and 17 are applied to a second subtracter 20 where the output Vt8 of the fifth circuit 16 is subtracted from the output Vt17 of the sixth circuit 17 to produce a tracking error signal TE at reproducing of the odd track.

A switch 21 is provided for selectively connecting the subtracters 19 and 20 to an output terminal T based on the discriminating signal D from the comparator 18. When the even track is reproduced, the switch 21 is operated to connect the first subtracter 19 to the output terminal T. When the odd track is reproduced, the switch 21 is operated to connect the second subtracter 20 to the output terminal T.

The operation for producing the tracking error signal will be described with reference to FIG. 3 and 4.

Figure 3:
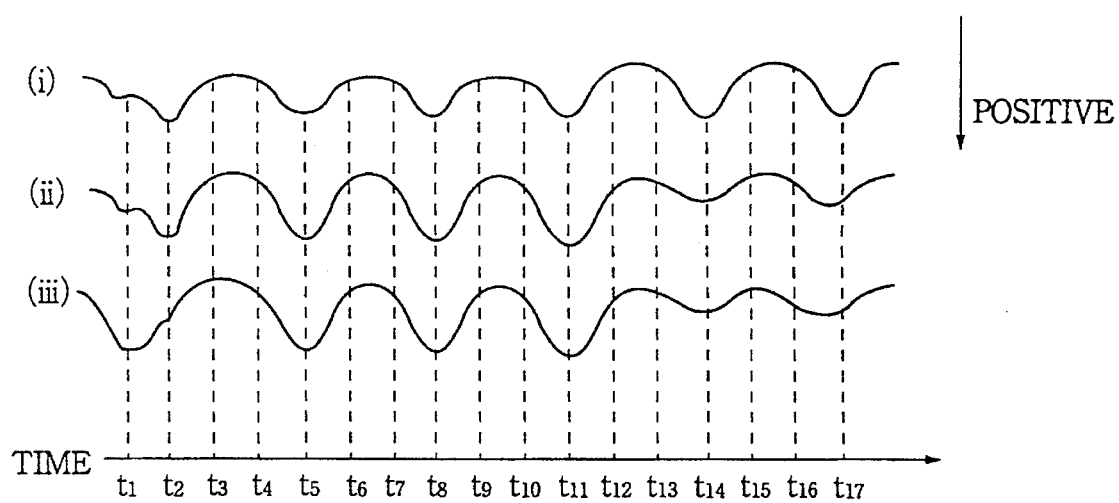
FIG. 3 shows waveforms of detected signal in dependency on laser beams.

FIG. 3 shows waveforms (i), (ii) and (iii) of detected signals detected by the laser beam LB which passes different paths (a), (b) and (c), respectively, as shown in FIG. 1. i) The laser beam passes the path (a) in FIG. 1.

If the track pits are irradiated with the laser beam in the path (a), a detected signal having a waveform (i) is obtained. Since the discriminating pit $P_D$ is not formed on the path (s) and pit $P_{D2}$ is near the path (a), the output voltage Vt2 is higher than the output voltage Vt1 as shown in FIG. 3. The output voltages Vt1 and Vt2 compared in the comparator 18 are represented as follow.

$Vt2-Vt1>0$

The comparator 18 produces the discriminating signal D of a high level "H". The switch 21 is operated to connect the output terminal T to the second subtracter 20.

As shown in FIG. 1, since the laser beam passes on the path (a) closer to the second tracking pit WP2 at the sampling timing t17 than the first tracking pit WP1 at the sampling timing t8, a level of a reproduced signal of the second tracking pit WP2 becomes higher than that of the first tracking pit. As a result, outputs Vt17 and Vt8 of the latching circuits 17 and 16 subtracted at the second subtracter 20 are represented as follows.

$Vt17-Vt8>0$

Thus, a positive tracking error signal TE is output from the terminal T through the switch 21. ii) The laser beam passes the path (b) in FIG. 1.

If the track pits are irradiated with the laser beam in the path (b), a detected signal having a waveform (ii) is obtained.

Since the laser beam on the path (b) scans near the odd track, the comparator 18 produces the discriminating signal D of a high level "H". Thus, the switch 21 is operated to connect the second subtracter 20 to the output terminal T.

Since the laser beam passes closer to the first tracking pit WP1 at the timing t8 than the second tracking pit WP2 at the timing t17, a level of a reproduced signal of the first tracking pit becomes higher than that of the second tracking pit. As a result, outputs Vt17 and Vt8 of the latching circuits 17 and 16 subtracted at the second subtracter 20 is represented as follows.

$Vt17-Vt8<0$

Thus, a negative tracking error signal TE is output from the terminal T through the switch 21. (iii) The laser beam passes the path (c) in FIG. 1.

In this case, a detected signal having a waveform (iii) is obtained. It will be seen that the laser beam in the path (c) scans near the even track. The comparator 18 produces the discriminating signal D of a low level "L". The switch 21 is operated to connect the output terminal T to the first subtracter 19.

On the even tracks as shown in FIG. 1, since the laser beam passes closer to the first tracking pit WP1 at the sampling timing t5 than the second tracking pit WP2 at the sampling timing t14, a level of a reproduced signal of the first tracking pit becomes higher than that of the second tracking pit. As a result, outputs Vt5 and Vt14 of the latching circuit 14 and 15 subtracted at the first subtracter 19 are represented as follows.

$Vt5-Vt14>0$

Thus, a positive tracking error signal TE is output from the terminal T through the switch 21.

FIG. 4a shows the tracking error signal TE of the present invention. The tracking error signal TE crossing at a zero point is always in the on-track state, and there is no off-state. Thus, the tracking operation is stabilized. As shown in FIG. 4b, the conventional tracking error signal TE' is on-track state and off-track state at the zero point.

Figure 5:
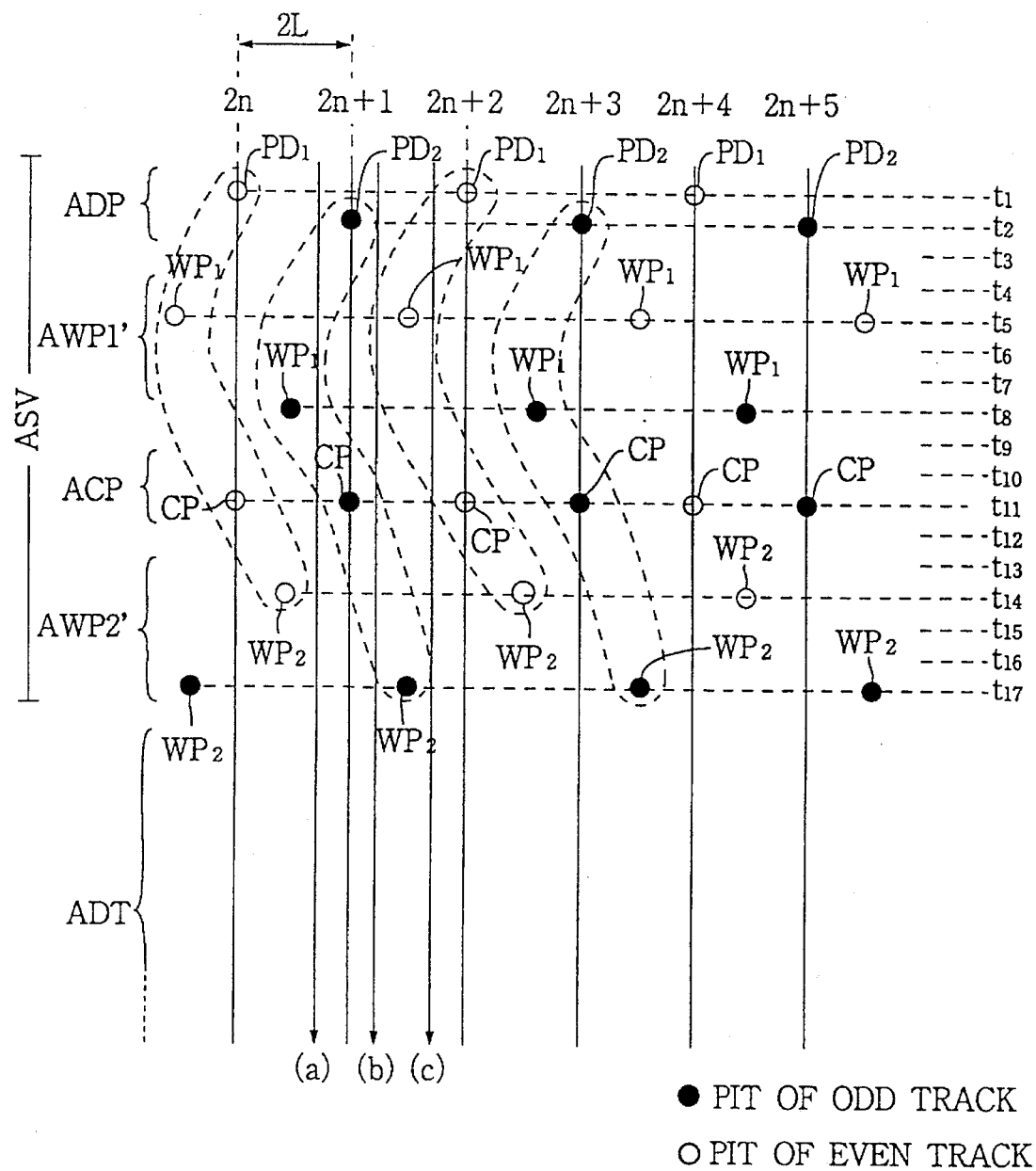
FIG. 5 is a schematic diagram showing a second embodiment of the present invention.

Referring to FIG. 5 showing a recording format of the second embodiment, in the second embodiment, the first and second tracking pits on the odd tracks are formed in a different manner from the first embodiment.

In a first tracking pit area AWP1', the first tracking pits WP1 in the segment of odd tracks 2n+1, 2n+3, 2n+5 are provided on the left side of the track center of the odd track corresponding to the sampling timing t8.

In a second tracking pit area AWP2', the second tracking pits WP2 in the segment of odd tracks 2n+1, 2n+3, 2n+5 are provided on the right side of the track center of the odd track corresponding to the sampling timing t17.

The first and second tracking pits WP1 of the even tracks 2n, 2n+2, 2n+4 are provided on the even tracks in the same manner as the first embodiment. Other structures are the same as the first embodiment and same parts are identified with the same reference numerals as FIG. 1.

Figure 6:
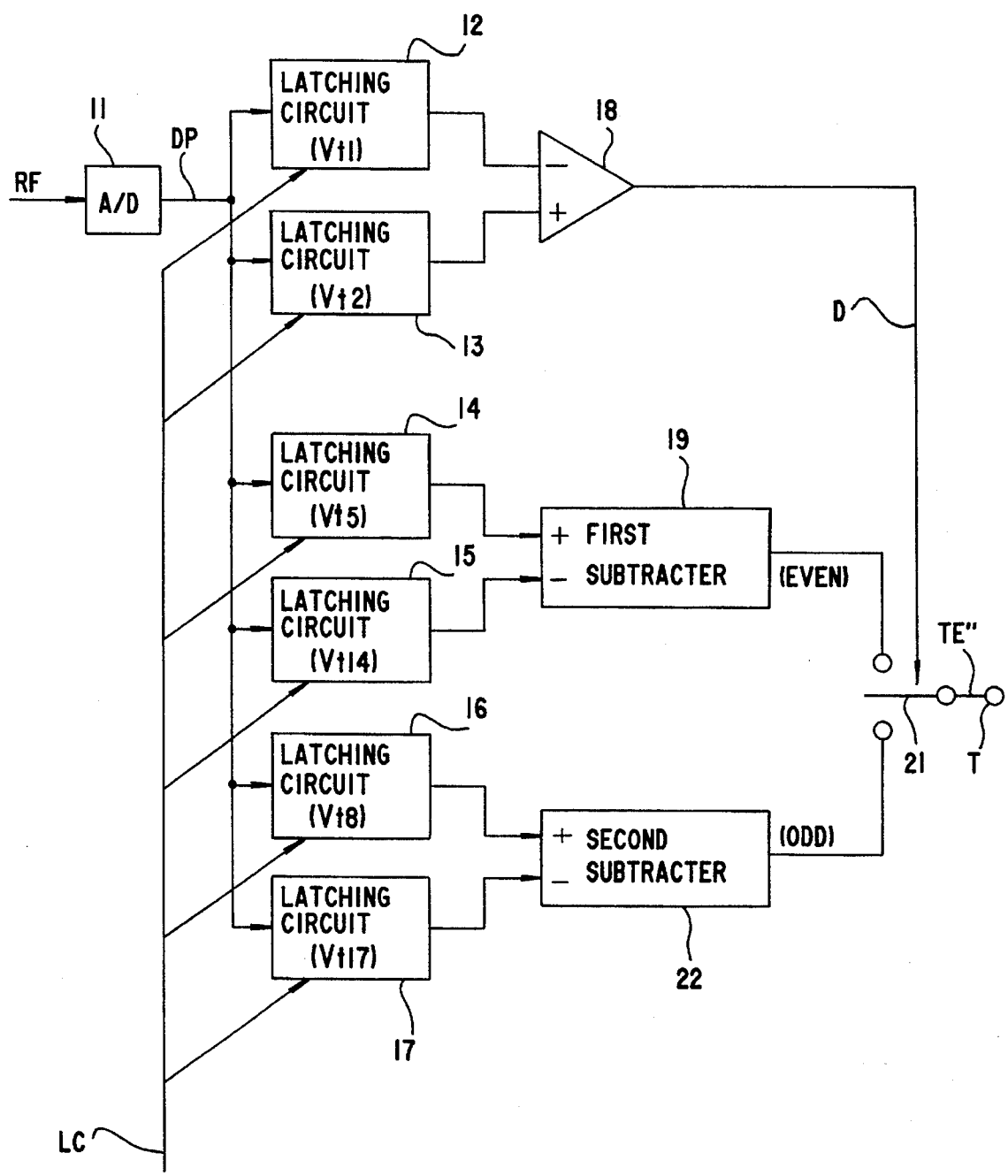
FIG. 6 is a block diagram showing a tracking error signal generating system of the second embodiment.
Figure 9:
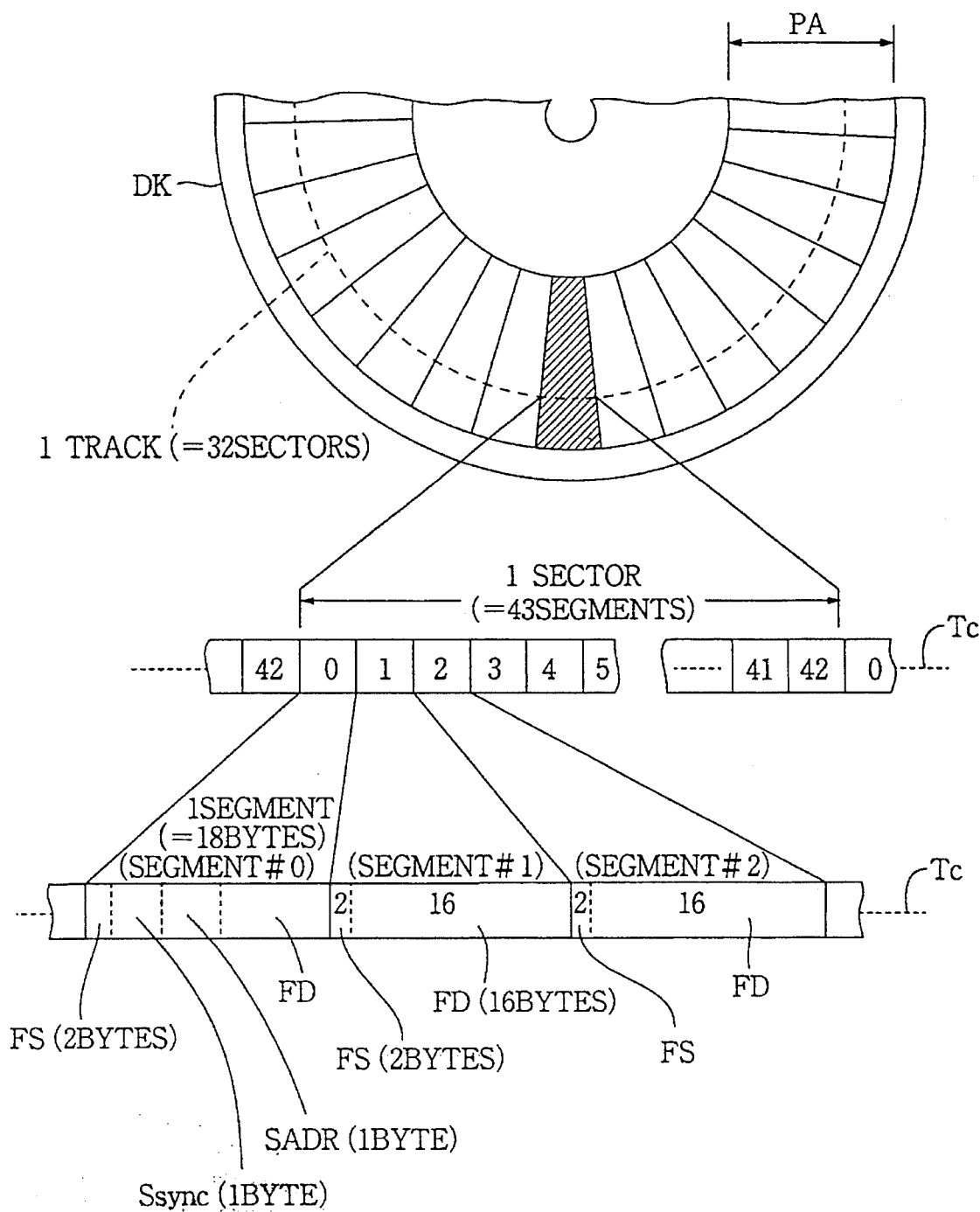
FIG. 9 is a schematic diagram showing a recording format for an optical disc using a conventional sampled servo tracking method.
Figure 10:
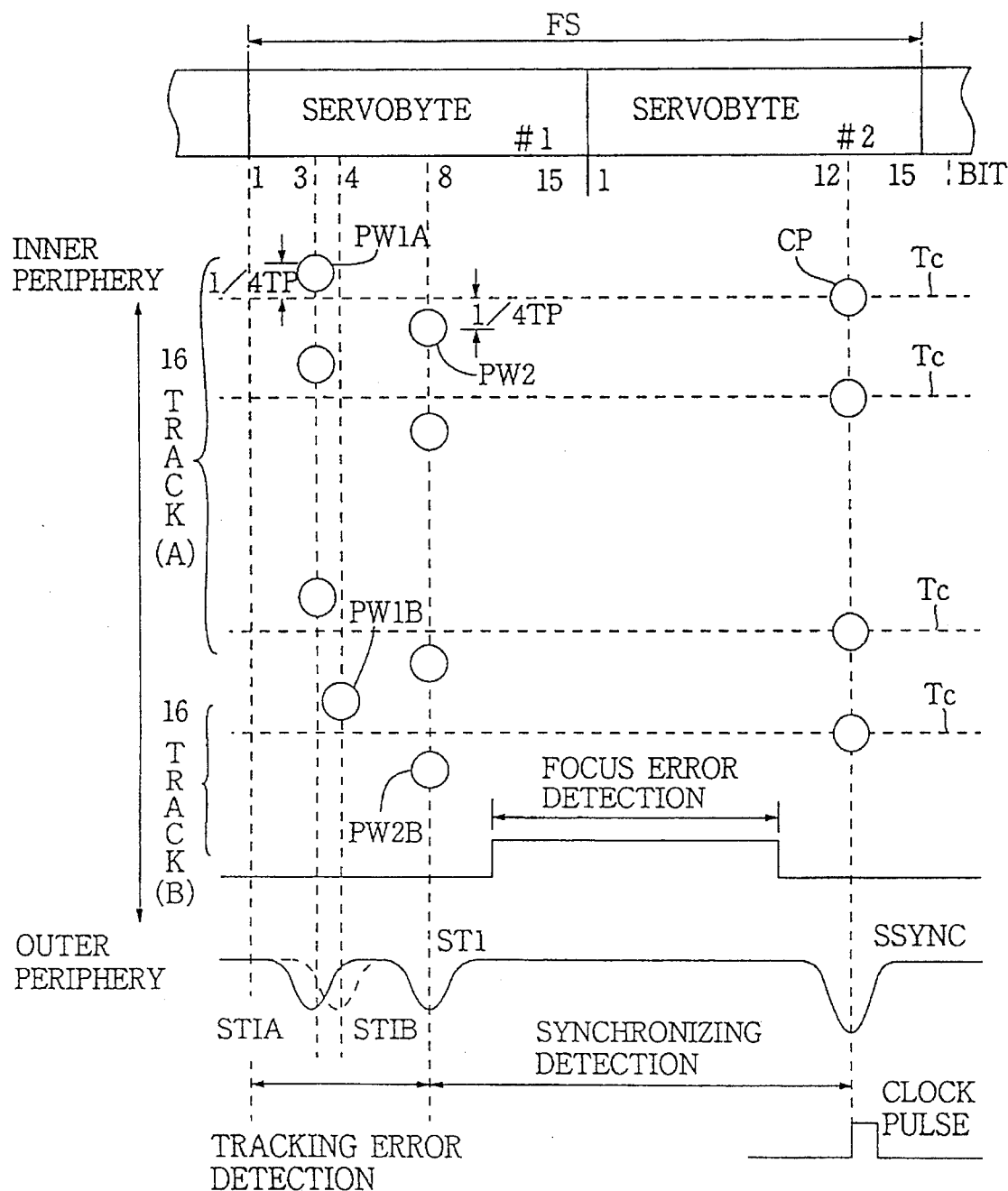
FIG. 10 is a diagram showing a servo byte of the conventional recording format.
Figure 11:
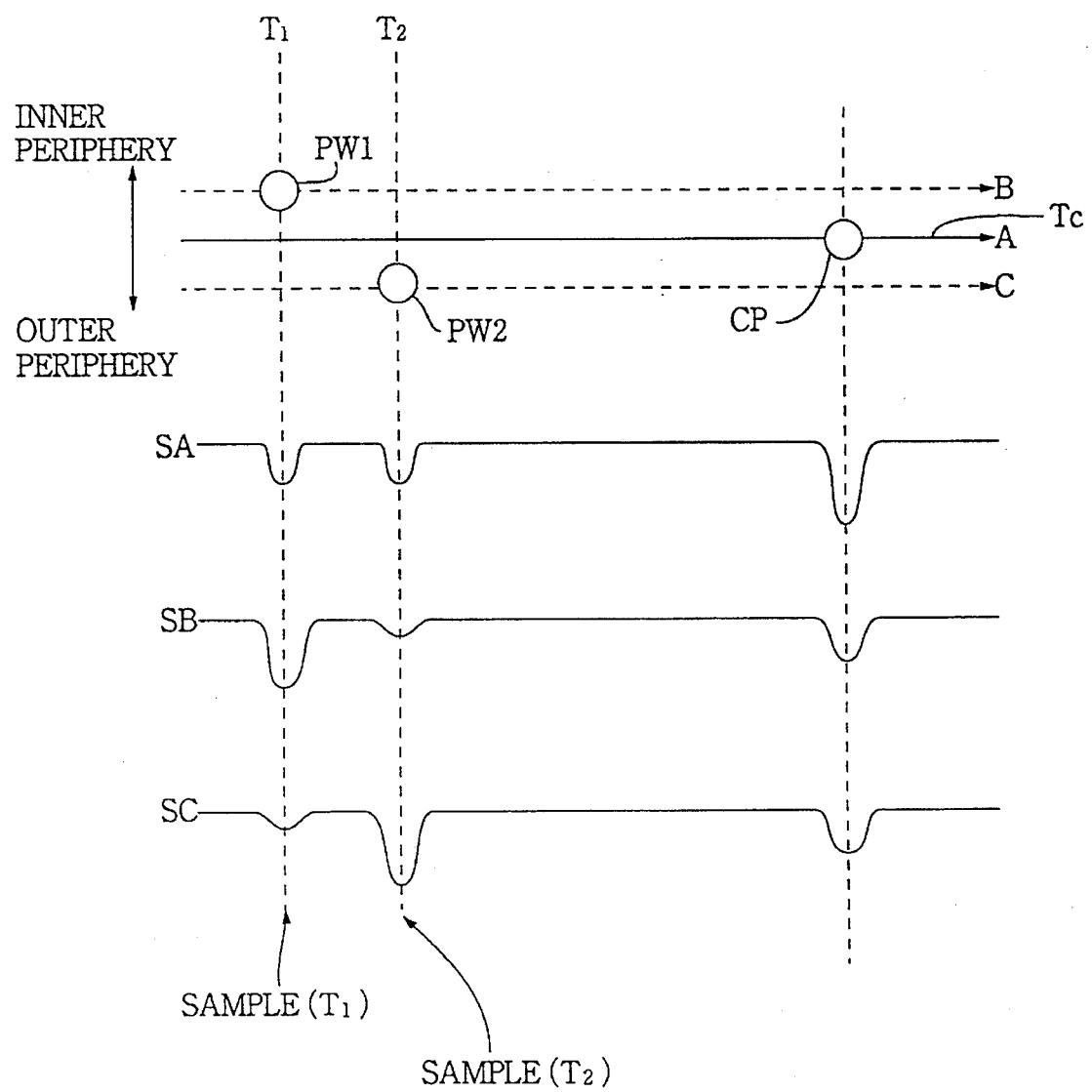
FIG. 11 is a diagram showing detected signals by the conventional method.
Figure 12:
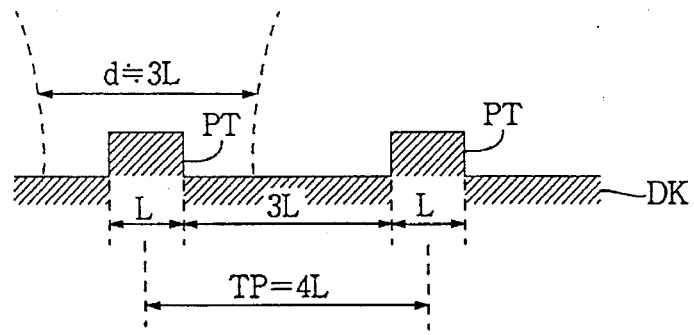
FIGS. 12a, 12b and 12c are schematic sectional views showing track pits formed on the conventional disc.
Figure 12:
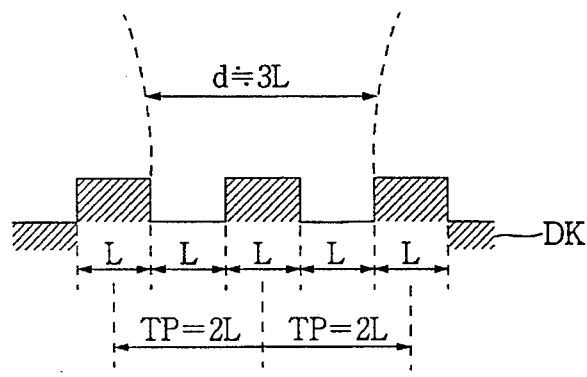
Figure 12:
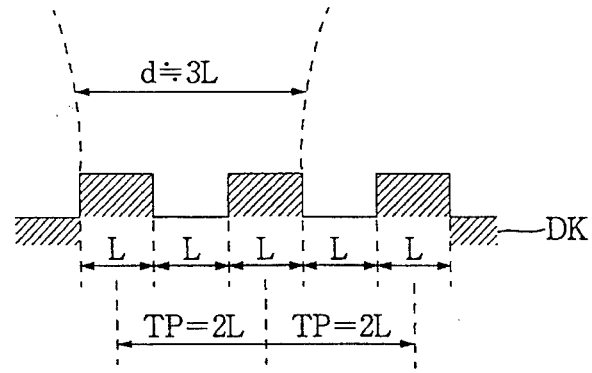
Figure 13:
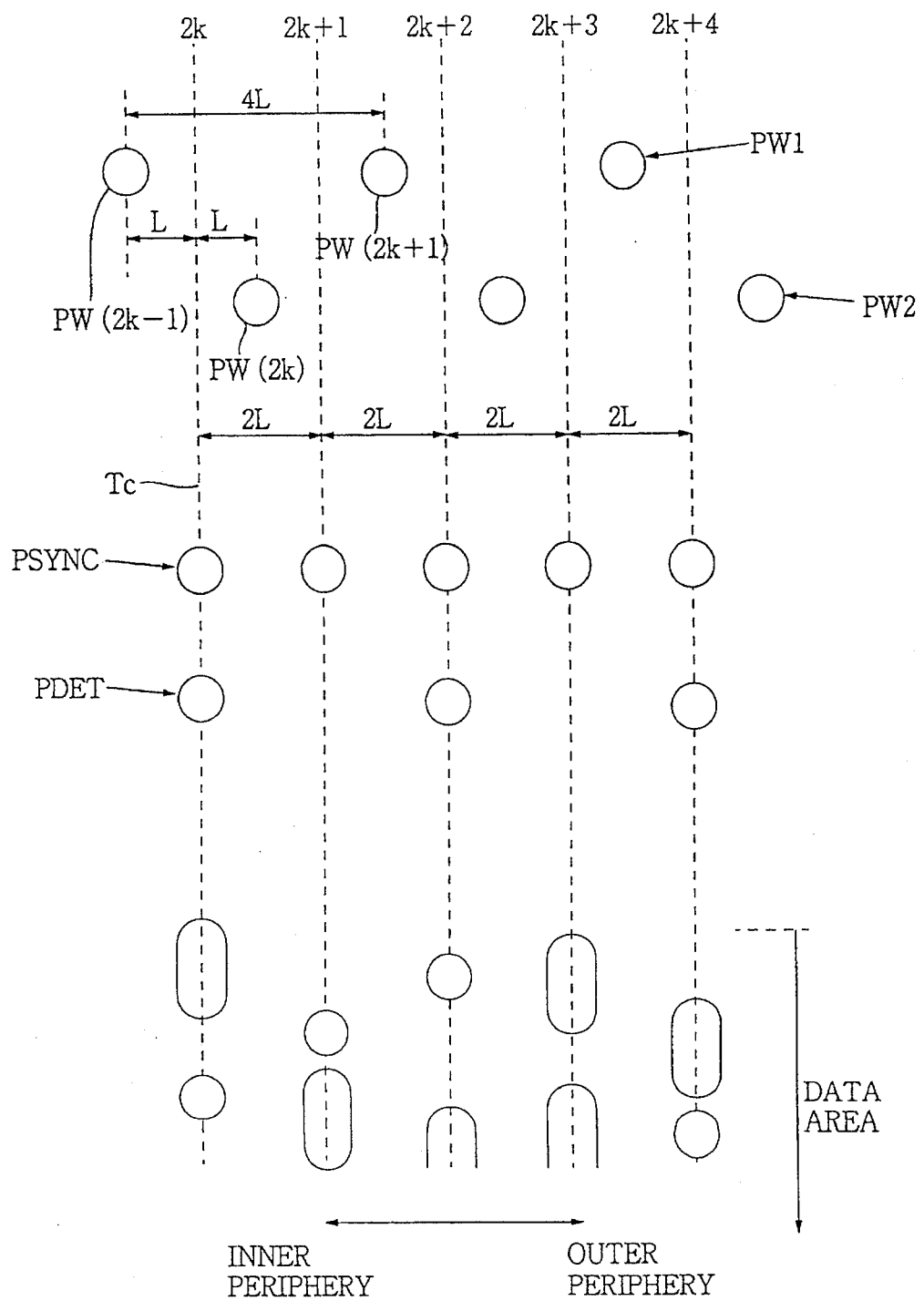
FIG. 13 is a diagram showing a recording format for another conventional method.
Figure 14:
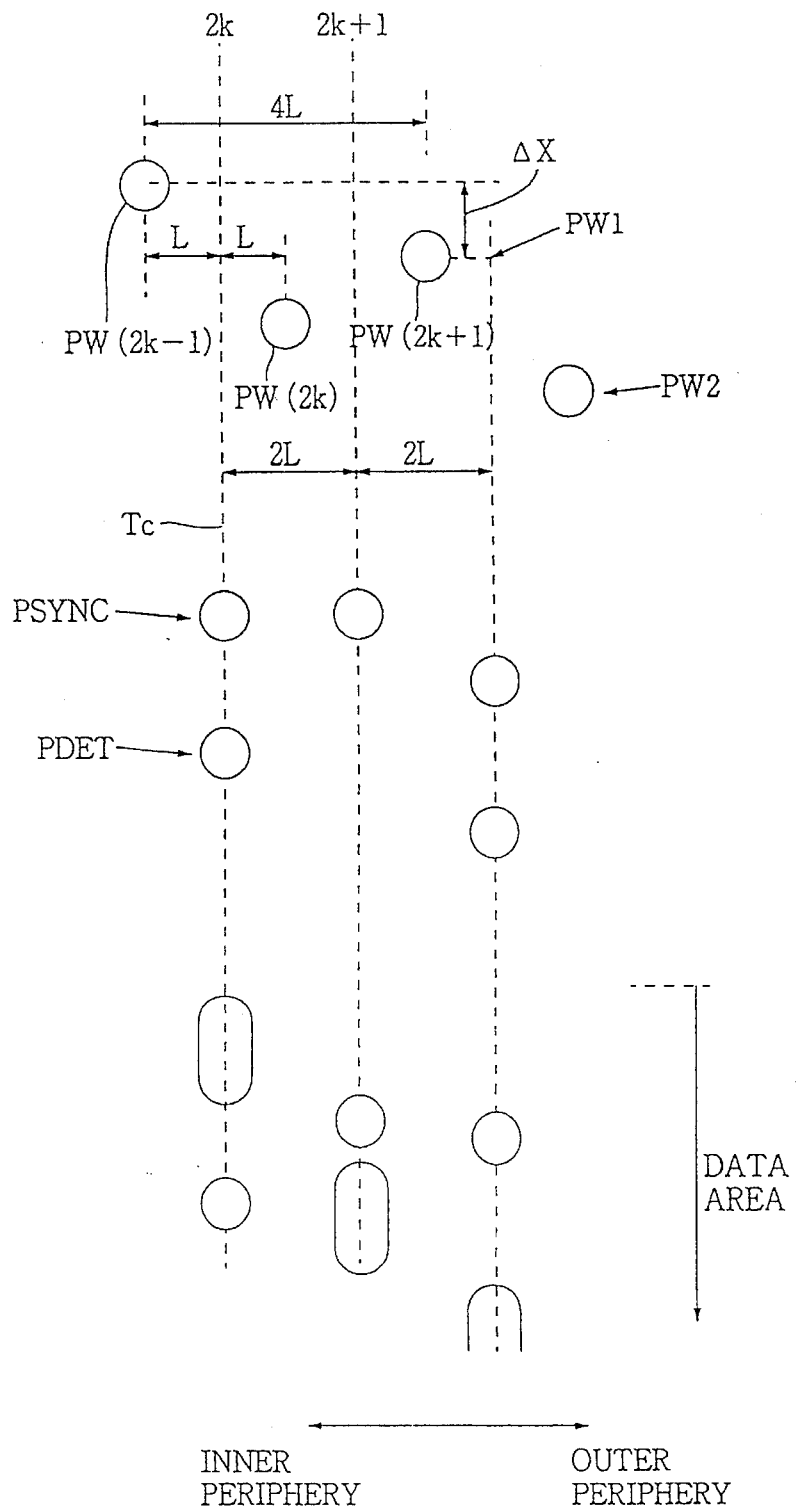
FIG. 14 is a diagram explanatory showing the recording format of FIG. 13.

Referring to FIG. 6, a tracking error generating system of the second embodiment is provided with a second subtracter 22 applied with outputs Vt8 and Vt17 of the fifth and sixth latching circuit 16 and 17. In the second subtracter 22, the output voltage Vy17 of the sixth circuit 17 is subtracted from the output voltage Vt8 of the fifth circuit 16 to generate a tracking error signal TE" at reproducing of the even track.

Other structures are the same as the first embodiment and the same parts thereof are identified with the same reference numerals as FIG. 2.

The operation will be described with reference to FIG. 7. When the track pits are irradiated with the laser beams along the paths (a), (b) and (c) as shown in FIG. 5, which are the same as the first embodiment, respective waveforms (I), (II) and (III) of detected signals are obtained.

(I) The laser beam which passes along the path (a) in FIG. 5.

As described in the first embodiment, the laser beam (a) scans near the odd track, and in dependency on the difference between the output voltages Vt1 and Vt2, the second subtracter 22 is connected to the output terminal T through the switch 21.

On the odd tracks, since the laser beam passes close to the first tracking pit WP1, the level of the reproduced signal of the first tracking pit WP1 becomes higher than that of the second tracking pit WP2. The outputs Vt17 and Vt8 of the latching circuits 17 and 16 subtracted at the second subtracter 22 are represented as follows.

$$Vt8-Vt17>0$$

Thus, a positive tracking error signal TE" is output from the terminal T.

(II) The laser beam passes the path (b) in FIG. 5.

Since the laser beam scans near the odd track and passes close to the second tracking pit WP2, the level of a reproduced signal of the second tracking pit becomes higher than that of the first tracking pit. The outputs Vt17 and Vt8 are represented as follows.

$$Vt8-Vt17<0$$

Thus, a negative tracking error signal TE" is output from the terminal T through the switch 21.

(III) The laser beam which passes along the path (c) in FIG. 5.

The laser beam scans near the even track on which first and second tracking pits are provided in the same manner as the first embodiment. Consequently, the same operating result as the term (iii) of the first embodiment is obtained. The subtracter 19 produces a positive tracking error signal TE" which is output from the terminal T through the switch 21.

FIG. 8 shows the tracking error signal TE" of the second embodiment. The same effect as the first embodiment is obtained.

In the second embodiment, the tracking pits on the respective even tracks and odd tracks are disposed in the same patterns with respect to the corresponding track centers as shown by dotted lines of FIG. 5. If crosstalk occurs to influence the tracking error signal because of such a disposition, the problem can be dissolved by increasing the distance of the tracking pits in the time axis direction. Thus, it is possible to obtain the tracking error signal with accuracy.

In accordance with the present invention, a pair of tracking pits are provided for every track. Therefore, the relative position of the pits does not change. Hence, even if the position of the tracking pit is deflected at recording because of rotating jitter of the recording device, the tracking error signal is accurately generated.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical disc having a plurality of tracks arranged in a radial direction of the disc, each of the tracks having a plurality of servo areas, the disc comprising:

a first even track disposed directly adjacent a first odd track, wherein said first odd track is disposed directly adjacent a second even track such that said first odd track is disposed between said first even track and said second even track;

wherein said first even track comprises a first even track discriminating pit provided at a first timing position for discriminating whether the track is an even or odd track, a first even track first tracking pit disposed on a first side of said first even track at a third timing position, wherein in said third timing position is after said first timing position, and a first even track second tracking pit disposed on a second side of said first even track at a fifth timing position, wherein said fifth timing position is after said third timing position;

wherein said first odd track comprises a first odd track discriminating pit provided at a second timing position for discriminating whether the track is an even or odd track, a first odd track first tracking pit disposed on a first side of said first odd track at a fourth timing position, wherein in said fourth timing position is after said second timing position, and a first odd track second tracking pit disposed on a second side of said first odd track at a sixth timing position, wherein in said sixth timing position is after said fourth timing position;

wherein said second even track comprises a first even track discriminating pit provided at said first timing position for discriminating whether the track is an even or odd track, a second even track first tracking pit disposed on a first side of said second even track at said third timing position, and a second even track second tracking bit disposed on a second side of said second even track at said fifth timing position;

wherein a first time interval is defined between said third timing position and said fourth timing position;

wherein a second time interval is defined between said fifth timing position and said sixth timing position; and wherein said first time interval and said second time interval are equivalent.

2. The disc according to claim 1 wherein:

the first tracking pits and the second tracking pits of the adjacent two tracks are disposed on different sides with respect to the track.

3. The disc according to claim 1 wherein:

the first tracking pits and the second tracking pits of the adjacent two tracks are disposed on the same side with respect to the track.

4. The disc according to claim 1 further comprising:

a discriminating pit provided on the track at a position before the first tracking pit in timing for discriminating the position of the track in the radial direction of the disc.

5. The disc according to claim 1 wherein:

each of the tracking pits is disposed on a center line between the adjacent tracks.

6. The optical disc according to claim 1 wherein the first and second tracking pits of even tracks are disposed at a same timing, and the first and second tracking pits of odd tracks are disposed at a same timing.

\* \* \* \* \*